(No Model.)
G. P. JOHNSON.
THILL COUPLING.
No. 560,722.  Patented May 26, 1896.
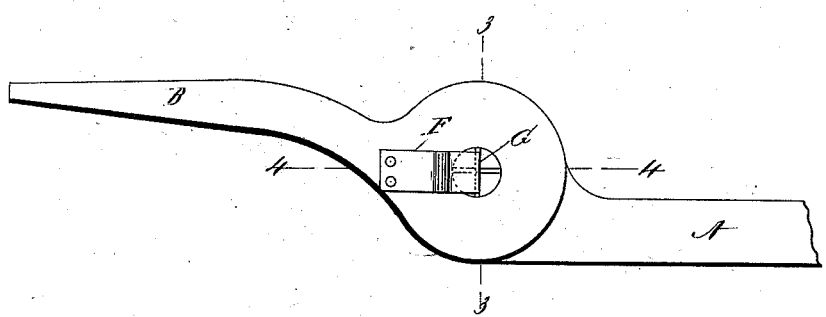
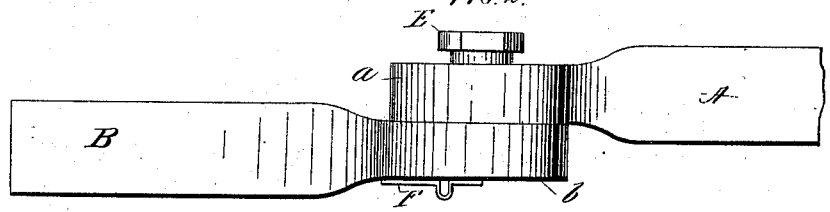
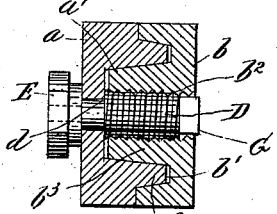
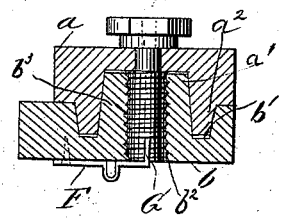
WITNESSES:
John Buckler,
C. Gerst
INVENTOR
George P. Johnson,
BY
Edgar Tate & Co
ATTORNEYS.

UNITED STATES PATENT OFFICE.

GEORGE P. JOHNSON, OF GLOVERSVILLE, NEW YORK.

THILL-COUPLING.

SPECIFICATION forming part of Letters Patent No. 560,722, dated May 26, 1896.

Application filed September 18, 1895. Serial No. 562,880. (No model.)

*To all whom it may concern:*

Be it known that I, GEORGE P. JOHNSON, a citizen of the United States, and a resident of Gloversville, in the county of Fulton and State of New York, have invented certain new and useful Improvements in Thill-Couplings, of which the following is a specification, reference being had to the accompanying drawings, forming a part thereof, in which similar letters of reference indicate corresponding parts.

This invention relates to thill-couplers, such as are usually employed in coupling the thills, shafts, or poles to a wagon, carriage, buggy, or similar vehicle; and the object thereof is to provide a simple and effective device of this class which may be attached to or connected with any form of vehicle, and which is also comparatively inexpensive and well adapted to accomplish the result for which it is intended.

The invention is fully disclosed in the following specification, of which the accompanying drawings form a part, in which—

Figure 1 is a side view of my improved coupler; Fig. 2, a plan view thereof; Fig. 3, a section on the line 3 3 of Fig. 1, and Fig. 4 a section on the line 4 4 of Fig. 1.

In the practice of my invention I employ a bar A, which is adapted to be connected with the forward axle of the vehicle, and said bar is provided with a circular head $a$, and connected therewith in the manner hereinafter described is a plate or bar B, provided with a head $b$, and said plate or bar B is adapted to receive or be connected with the shafts or poles of a vehicle, as will be readily understood, or said plate or bar B may be extended and formed into the shafts or poles of the vehicle. The head $b$ is circular in form and provided with an annular groove or channel $b'$, and the central portion thereof is provided with a screw-threaded bore $b^2$ and is formed into a conical projection $b^3$. The head $a$ is provided with a central conical chamber or recess $a'$ and with an annular flange or projection $a^2$, adapted to fit within the annular groove or channel $b^2$ of the head $b$. The heads $a$ and $b$ are united by means of a screw-threaded plug D, which is passed through the head $b$, and said screw-threaded plug is provided with an extension $d$ of smaller diameter than the screw-threaded plug which passes through a corresponding opening formed centrally in the head $a$, and after the said plug has been passed through the heads $a$ and $b$ in the manner described a nut or bur E is secured thereon, being irremovably riveted or keyed thereto.

Secured to the side of the head $b$ is a plate-spring F, having an inwardly-directed end G, which is formed thereon, and which is adapted to engage with or enter a transverse slot formed in the end of a screw-threaded plug D, as clearly shown in Figs. 1 and 4. The heads $a$ and $b$, when thus united, are free to revolve or rotate one within or upon the other, as will be readily understood, and the only way that they can be separated is to remove the spring F in contact or in connection with the screw-threaded plug D and afterward remove said plug.

It will thus be seen that my improved coupler is simple in construction and operation and is also well adapted to accomplish the result for which it is intended, while being comparatively inexpensive.

My invention is not limited to the exact form, construction, and arrangement of parts shown and described, and I therefore reserve the right to make all such alterations and changes therein as fairly come within the scope of the invention.

Having fully described my invention, I claim and desire to secure by Letters Patent—

A thill-coupler comprising a bar A, provided with a circular head $a$, having a central conical perforated recess $a'$, and annular flange $a^2$; a bar B provided with a circular head $b$, having an annular groove $b'$, and central conical projector $b^3$, interiorly screw-threaded: a screw-plug D having an extension $d$ of less diameter and having a transverse head-slot; a nut or bur E, and a plate-spring F, provided with an end projection, adapted to engage in a transverse slot of the screw-plug, all constructed and arranged substantially as herein shown and described.

In testimony that I claim the foregoing as my invention I have signed my name, in presence of the subscribing witnesses, this 14th day of September, 1895.

GEORGE P. JOHNSON.

Witnesses:
WILLIAM S. CASSEDY,
WILLIAM J. WILSON.